United States Patent
Kandler et al.

(10) Patent No.: US 11,054,239 B2
(45) Date of Patent: Jul. 6, 2021

(54) DEVICE, A TIRE PRESSURE MEASUREMENT SYSTEM, A TIRE, A VEHICLE, A METHOD AND A COMPUTER PROGRAM FOR DETERMINING INFORMATION INDICATING A LENGTH OF A FOOTPRINT OF A TIRE

(71) Applicant: Infineon Technologies AG, Neubiberg (DE)

(72) Inventors: Michael Kandler, Sauerlach (DE); Thomas Lange, Munich (DE); Jooil Park, Sungnam (KR)

(73) Assignee: Infineon Technologies AG

( * ) Notice: Subject to any disclaimer, the term of this patent is extended or adjusted under 35 U.S.C. 154(b) by 747 days.

(21) Appl. No.: 15/696,942

(22) Filed: Sep. 6, 2017

(65) Prior Publication Data

US 2018/0066929 A1  Mar. 8, 2018

(30) Foreign Application Priority Data

Sep. 7, 2016 (DE) ..................... 10 2016 116 696.0

(51) Int. Cl.
 *G01B 7/04* (2006.01)
 *B60C 23/04* (2006.01)
 (Continued)

(52) U.S. Cl.
 CPC .............. *G01B 7/046* (2013.01); *B60C 23/04* (2013.01); *B60C 23/064* (2013.01); *G01M 17/02* (2013.01)

(58) Field of Classification Search
 CPC ........ G01B 7/046; G01M 17/02; B60C 23/04; B60C 23/064
 See application file for complete search history.

(56) References Cited

U.S. PATENT DOCUMENTS 5,913,240 A   6/1999  Drahne et al.
6,959,593 B2 * 11/2005  Mancosu ............ B60C 23/0411
                                                          340/445

(Continued)

FOREIGN PATENT DOCUMENTS

DE   10 2009 059 789 A1   6/2011
DE   10 2012 204 141 A1   9/2013
(Continued)

OTHER PUBLICATIONS

Deepak Dhasarthy, "Estimation of vertical load on a tire from contact patch length and its use in vehicle stability control", Thesis submitted to the faculty of the Virginia Polytechnic Institute and State University, Jun. 1, 2010, pp. 1-98. [Online] URL: https://vtechworks.lib.vt.edu/bitstream/handle/10919/33559/Dhasarathy_D_T_2010.pdf.

(Continued)

*Primary Examiner* — Catherine T. Rastovski
(74) *Attorney, Agent, or Firm* — Design IP (57) ABSTRACT

Embodiments provide a device, a tire pressure measurement system, a tire, a vehicle, a method and a computer program for determining information indicating a length of a footprint of the tire. The device for determining information indicating a length of a footprint of a tire includes an input for a signal from a magnetic earth field sensor configured to generate the signal indicating a measured magnetic earth field. The device further includes a processing module, which is configured to determine the information indicating the length of the footprint of the tire based on the signal indicating the measured magnetic earth field.

15 Claims, 4 Drawing Sheets

(51) Int. Cl.
*B60C 23/06* (2006.01)
*G01M 17/02* (2006.01)

(56) References Cited

U.S. PATENT DOCUMENTS

| | | | |
|---|---|---|---|
| 7,406,876 | B2 | 8/2008 | Krozer et al. |
| 7,432,851 | B2 | 10/2008 | Dulac |
| 7,646,195 | B2 * | 1/2010 | Salfelner ............. B60C 23/0408 |
| | | | 324/244 |
| 7,942,047 | B2 | 5/2011 | Vassilieff et al. |
| 8,065,911 | B2 | 11/2011 | Taylor et al. |
| 8,165,827 | B2 | 4/2012 | Savaresi et al. |
| 8,296,080 | B2 | 10/2012 | Mancosu et al. |
| 8,880,286 | B2 | 11/2014 | Fink |
| 9,701,287 | B2 | 7/2017 | Kretschmann et al. |
| 2002/0166371 | A1 | 11/2002 | Ratti et al. |
| 2005/0103100 | A1 | 5/2005 | Miyoshi et al. |
| 2006/0212193 | A1 | 9/2006 | Breed |
| 2009/0069969 | A1 * | 3/2009 | Hammerschmidt .. B60C 23/064 |
| | | | 701/31.4 |
| 2009/0205414 | A1 * | 8/2009 | Vassilieff ................. G01B 7/14 |
| | | | 73/146 |
| 2012/0253590 | A1 * | 10/2012 | Fink .................... B60C 23/0486 |
| | | | 701/34.4 |
| 2015/0247780 | A1 | 9/2015 | Kretschmann et al. |
| 2016/0011279 | A1 | 1/2016 | Rasbornig et al. |
| 2016/0297262 | A1 * | 10/2016 | Tsuchikawa ........ B60C 23/0488 |

FOREIGN PATENT DOCUMENTS

| | | | |
|---|---|---|---|
| GB | | 2533658 | * 12/2014 |
| WO | 2015137951 | A1 | 9/2015 |

OTHER PUBLICATIONS

Darren Quick, "Continental's intelligent tires will detect a vehicle's weight", New Atlas, Mar. 4, 2013, pp. 1-3, [Online] URL: https://newatlas.com/continental-load-detecting-tire/26496/.

Vladimir Rievaj, Ján Vrábel, František Synák, Ladislav Bartuška, "The Effects of Vehicle Load on Driving Characteristics", Advances in Science and Technology Research Journal, Mar. 2018, pp. 142-149, vol. 12(1).

* cited by examiner

DEVICE, A TIRE PRESSURE MEASUREMENT SYSTEM, A TIRE, A VEHICLE, A METHOD AND A COMPUTER PROGRAM FOR DETERMINING INFORMATION INDICATING A LENGTH OF A FOOTPRINT OF A TIRE

FIELD

The present disclosure relates generally to a device, a tire pressure measurement system, a tire, a vehicle, a method and a computer program for determining information indicating a length of a footprint of the tire.

BACKGROUND

Wheel units are electronic devices, which are used to monitor wheel properties or parameters. For example, monitoring a tire pressure has become part of governmental regulations in many countries. Tires or wheels of vehicles are equipped with tire pressure measurement devices, which communicate signals indicative of a tire pressure to a control unit or controller of the vehicle. For example, tire pressure values can be determined and displayed to a user of the vehicle, warning indications can be generated if the tire pressure decreases below a critical threshold.

Manufacturers of Tire Pressure Monitoring Systems (TPMS) provide in-tire modules, units or devices mounted in or at the tire, and replace or complement valve units (module mounted at the valve). Some of these in-tire devices are mounted onto the inner circumferential area or running tread of the tire, e.g. mounted in dedicated pockets, and may provide additional information or functionality compared to valve-mounted solutions at the rim of the wheel. One feature is the so-called load detection.

While during rotation of the wheels the valve-mounted devices follow a circular trajectory, in-tire devices follow the outer trajectory of the tire. The outer trajectory is flattened in a contact area (footprint) between the tire and the ground or road. The higher the load of the vehicle the more significant is the flattening, the contact area respectively. This effect also depends on the tire pressure. Measuring the dimension or length of the footprint/contact area may therefore enable load detection.

In some conventional systems acceleration sensors are used in the tires. Acceleration pulses are generated in the in-tire device when it enters and exits the footprint area. The pulses can be measured using an acceleration sensor. Acceleration sensors comprise micro-mechanical elements or components, which can be damaged or destroyed, particularly, when they are excited at their resonance frequency. Size and weight of an acceleration sensor also have an influence on the long term stability and functioning.

SUMMARY

Embodiments provide a device, a tire pressure measurement system, a tire, a vehicle, a method and a computer program for determining information indicating a length of a footprint of a tire. Embodiments use a magnetic earth field sensor, which can be used as an in-tire sensor device. The magnetic earth field sensor senses the magnetic field of the earth and provides a signal indicative of the measured field.

Embodiments provide a device for determining information indicating a length of a footprint of a tire. The device includes an input for a signal from a magnetic earth field sensor configured to generate the signal indicating a measured magnetic earth field. The device further includes a processing module configured to determine the information indicating the length of the footprint of the tire based on the signal indicating the measured magnetic earth field. A magnetic earth field sensor may be smaller and lighter than an acceleration sensor and may include less or even no mechanically movable components or elements. A magnetic earth field sensor may be smaller and more cost effective than an acceleration sensor.

The magnetic earth field sensor is configured to measure the magnetic earth field along a radial direction and/or a tangential direction of the tire. Some embodiments may use multiple magnetic sensors or a sensor configured to measure the magnetic field of the earth along multiple directions. Multiple independent signals or signals indicating the magnetic field of the earth of different orientations may be provided enhancing the robustness or reliability of the determined footprint length. In some embodiments the processing module is configured to determine a timing of deviations from a sinusoidal signal sequence in the signal. Embodiments may use signal processing to determine the footprint length from the magnetic field signal. For example, the processing module may be configured to determine the information indicating the length of the footprint based on the timing of the deviations and information indicating a rotational velocity of the tire. Embodiments may use the timing information of the entries and exits of the sensor into the footprint, which are indicated in the signal, to determine the footprint length. Duration of the trajectory part within the footprint may be evaluated against duration of a full revolution of the tire.

In some embodiments the processing module is configured to determine the information indicating the length of the footprint based on a constant signal period in the signal. Embodiments may assume that the magnetic sensor follows a trajectory of constant magnetic field in the footprint. The processing module is configured to determine the information indicating the length of the footprint based on a differentiation of the signal. The processing module may be configured to differentiate the signal and to compare a differentiated version of the signal to a threshold. For example, the processing module may be configured to determine first time information on when the magnetic earth field sensor enters a footprint section of the tire, and second time information on when the magnetic earth field sensor exits the footprint section through the threshold comparison. The processing module may be further configured to determine the information indicating the length of the footprint based on a relation of information on footprint duration and information on duration of a rotation cycle of the tire.

In some embodiments the processing module may be configured to dynamically adapt the threshold. For example, the processing module is configured to adapt the threshold relative to a maximum signal amplitude. By adapting the threshold, embodiments may improve a reliability of the footprint length detection. In further embodiments the processing module may be configured to carry out a localization of multiple tires on wheels of a vehicle. For example, the processing module may be configured to correlate rotational frequencies of the wheels determined based on the signal with reference information on the rotational frequencies of the wheels. Reference information on the rotational frequencies of the wheels may be information provided by an anti-lock braking system. The processing module may be configured to correlate an angular position of a wheel indicated by the signal with reference information on angular position of the wheel. Reference information on the angular position may be information provided by an anti-lock braking system.

In some embodiments the device may include an analog-digital converter configured to sample an analog signal of the magnetic earth field sensor into a digital signal. In further embodiments the device includes the magnetic earth field sensor and the tire. In some embodiments the processing module may be configured to determine load information of the tire or a vehicle based on the information indicating the length of the footprint. Embodiments also provide a tire pressure measurement system including an embodiment of the above-described device. Embodiments also provide a tire for a vehicle including a magnetic earth field sensor configured to generate a signal indicating a measured magnetic earth field. Embodiments also provide a vehicle including an embodiment of the above-described device and/or tire.

Embodiments provide a method for determining information indicating a length of a footprint of a tire from a signal indicating a measured magnetic earth field. The method includes determining information on a timing of deviations from a sinusoidal signal sequence in the signal. The method further includes determining the information indicating the length of the footprint based on the timing of the deviations and information indicating a rotational velocity of the tire. In some embodiments the method may further include generating the signal indicating the measured magnetic earth field, e.g. using a magnetic earth field sensor. Another embodiment is a computer program product including a computer readable medium having computer readable program code embodied therein. The computer readable program code is configured to implement at least one of the methods described herein, when being loaded on a computer, a processor, or a programmable hardware component.

Embodiments further provide a computer program product including a computer readable medium having computer readable program code embodied therein, the computer readable program code being configured to implement at least one of or a combination of the above-described methods, when being loaded on a computer, a processor, or a programmable hardware component.

Embodiments further provide a tire, a TPMS, or a vehicle including an embodiment as described above.

BRIEF DESCRIPTION OF THE DRAWINGS

Some other features or aspects will be described using the following non-limiting embodiments of apparatuses/devices and/or methods and/or computer programs by way of example only, and with reference to the accompanying figures, in which.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
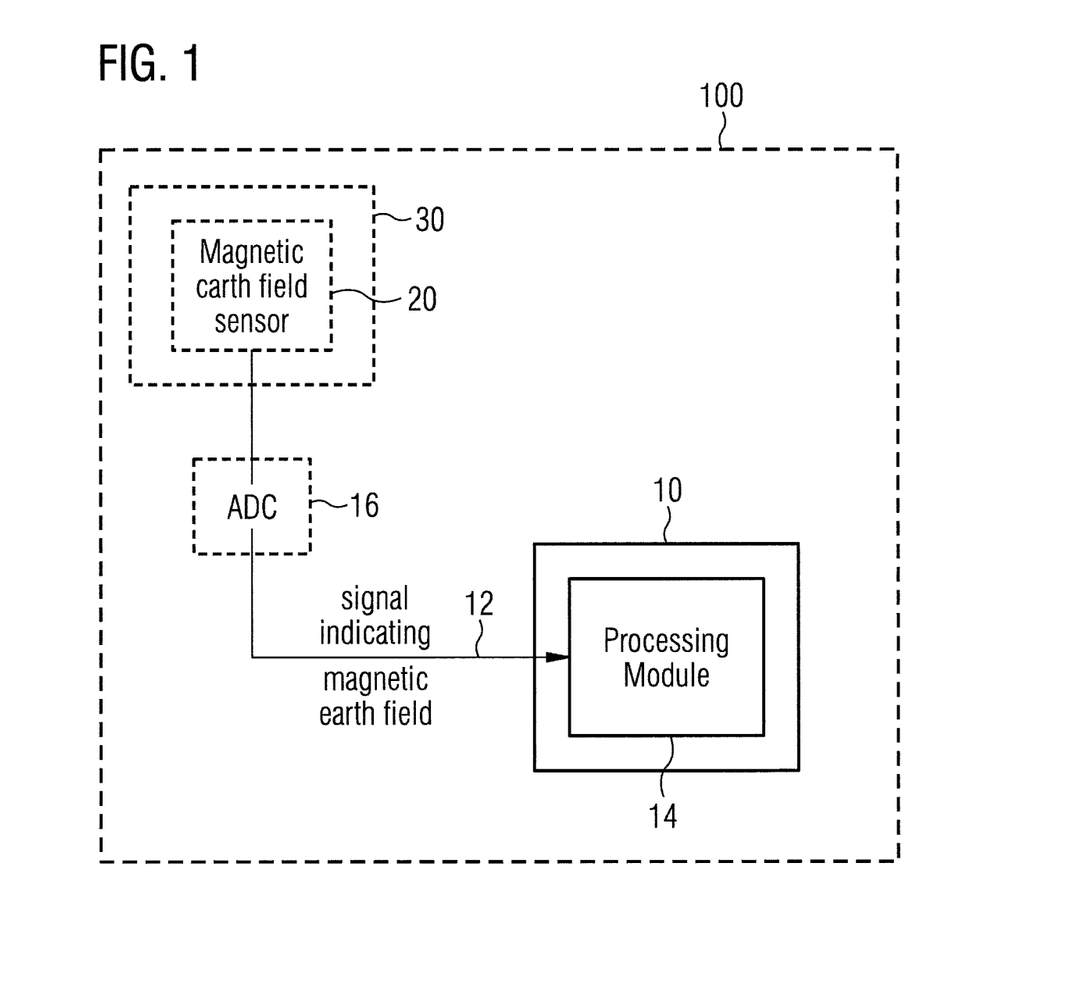
FIG. 1 shows a block diagram of an embodiment of a device, a tire and a vehicle.

FIG. 1 shows a block diagram of an embodiment of a device 10, a tire 30 and a vehicle 100 (optional features or components are shown in broken lines). The device 10 for determining information indicating a length of a footprint 32 of a tire 30 comprises an input 12 for a signal from a magnetic earth field sensor 20. The magnetic earth filed sensor 20 is configured to generate the signal indicating a measured magnetic earth field. As shown in FIG. 1 the input 12 is coupled to a processing module 14 configured to determine the information indicating the length of the footprint 32 of the tire 30 based on the signal indicating the measured magnetic earth field.

In embodiments the input 12 may correspond to any interface adapted to or configured for receiving a respective analog or digital signal from the magnetic earth field sensor 20. The input 12 may use a certain wired or wireless access technology, protocol, medium, etc. to establish a connection the processing module 14 and the magnetic earth field sensor 20. For example, a connection to exchange information in terms of binary data packets may be established. In embodiments, any other interface or input is conceivable to establish a connection or communication link between the processing module 14 and the magnetic earth field sensor 20, be it based on analog or digital communication, be it wired or wireless. In some embodiments the device may be part of a TPMS and communication between wheel- or tire units and a control unit or the processing module 14 may be wireless, e.g. using radio frequency signals or low frequency communication.

The processing module 14 may correspond to one or more control/processing units, one or more control/processing devices, or any means for controlling/processing. In some embodiments the processing module 14 may be implemented in software, which is executable on accordingly adapted hardware, such as a processor, a Digital Signal Processor (DSP), a multi-purpose processor, or the like.

As further shown in FIG. 1 as optional components (broken lines) the magnetic earth field sensor 20 may be comprised in a tire 30. The magnetic earth field sensor 20 may be configured to measure the effect of the magnetic earth field, the changing effects while rotating in the magnetic field of the earth with the tire, respectively. In embodiments such effect or its changes may be measured or sensed using any physical quantity, e.g. a Hall-sensor/Hall-voltage may be measured. Other magnetic earth field sensors types are also conceivable in one or more embodiments. Further examples are Magneto-Resistive (MR) sensors, Anisotropic MR-sensor (AMR), Colossal MR (CMR), Tunneling MR (TMR) and Extraordinary MR (EMR), etc., collectively referred to as XMR-sensors. In one or more embodiments the magnetic earth field sensor 20 may be single- or multi-dimensional. For example, the magnetic earth field sensor 20 is configured to measure the magnetic earth field along a radial direction and/or a tangential direction of the tire 30. Another embodiment is a tire 30 with a magnetic earth filed sensor 20 attached thereto or mounted therein.

Figure 2:
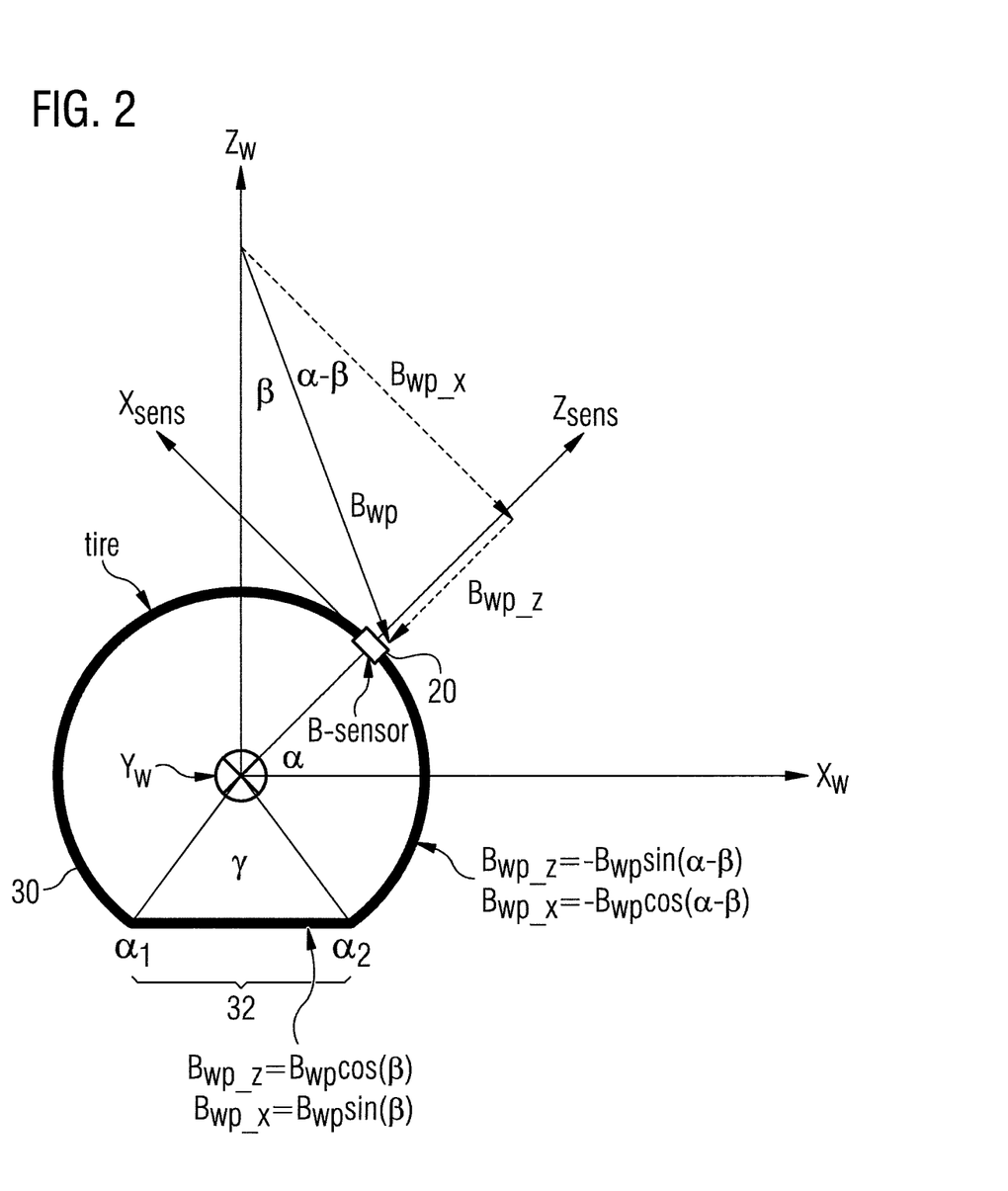
FIG. 2 illustrates footprint length detection in an embodiment.

FIG. 2 illustrates footprint 32 length detection in an embodiment. FIG. 2 shows a tire 30 with an in-tire-mounted magnetic earth field sensor 20 in an embodiment. The trajectory of the magnetic earth field sensor 20 follows the outer surface of the tire 30, which is of circular shape at the top and flat in the footprint section 32 at the bottom. The magnetic earth field sensor 10 may hence be an in-tire module or device. FIG. 2 further defines coordinates and vectors for the following description of further embodiments. The coordinates $x_w$, $y_w$ and $z_w$ are the wheel- or vehicle 100 coordinates, respectively. The coordinates of the magnetic earth field sensor 20 are $x_{sens}$ and $z_{sens}$. The perspective in FIG. 2 is oriented orthogonal to the rotation plane of the wheel, $y_w$ is orthogonal to the plane an points into the plane. The effective magnetic field vector $B_{wp}$ (with components $B_{wp\_x}$, and $B_{wp\_z}$) is a projection of the 3-dimensional field vector of the magnetic earth field into the rotation plane of the wheel 30. Said projection may depend on a driving direction of the vehicle 100 and may, however, be neglected in some embodiments. In FIG. 2 it is assumed that an inclination of the magnetic earth field in 90°-β, hence there is an angle of β between $B_{wp}$ and $z_w$.

As further shown in FIG. 2 the angle or angular width/section of the footprint 32 is γ, being defined between the two angles $α_1$ and $α_2$ (entry and exit angles), where α is the rotational angle of the magnetic earth field sensor 20.

It follows:

$Bwp\_z = -Bwp \sin(α-β)$, and $Bwp\_x = -Bwp \cos(α-β)$, for the circular part of the trajectory of the magnetic earth field sensor 20, and $Bwp\_z = Bwp \cos(β)$, and $Bwp\_x = Bwp \sin(β)$, for the footprint 32 part of the trajectory of the magnetic earth field sensor 20.

Embodiments may determine a footprint 32 length using an in-tire magnetic earth field sensor 20. The magnetic earth field sensor is sensitive enough to measure the magnetic earth field at sufficient resolution. In an embodiment the processing module 14 is configured to process the signal of the magnetic earth field sensor 20. During the circular part of the trajectory the signal of the magnetic earth field sensor 20 is sinusoidal and during the footprint 32 part it is approximately or theoretically constant, as illustrated in FIG. 2. The period of constant signal therefore indicates the footprint. The processing module 14 may be configured to determine the information indicating the length of the footprint 32 based on the constant signal period in the signal from the magnetic earth field sensor 20.

The processing module 14 may be configured to determine a timing of deviations from a sinusoidal signal sequence in the signal. The processing module 14 is configured to determine the information indicating the length of the footprint 32 based on the timing of the deviations and information indicating a rotational velocity of the tire 30b in an embodiment.

Figure 3:
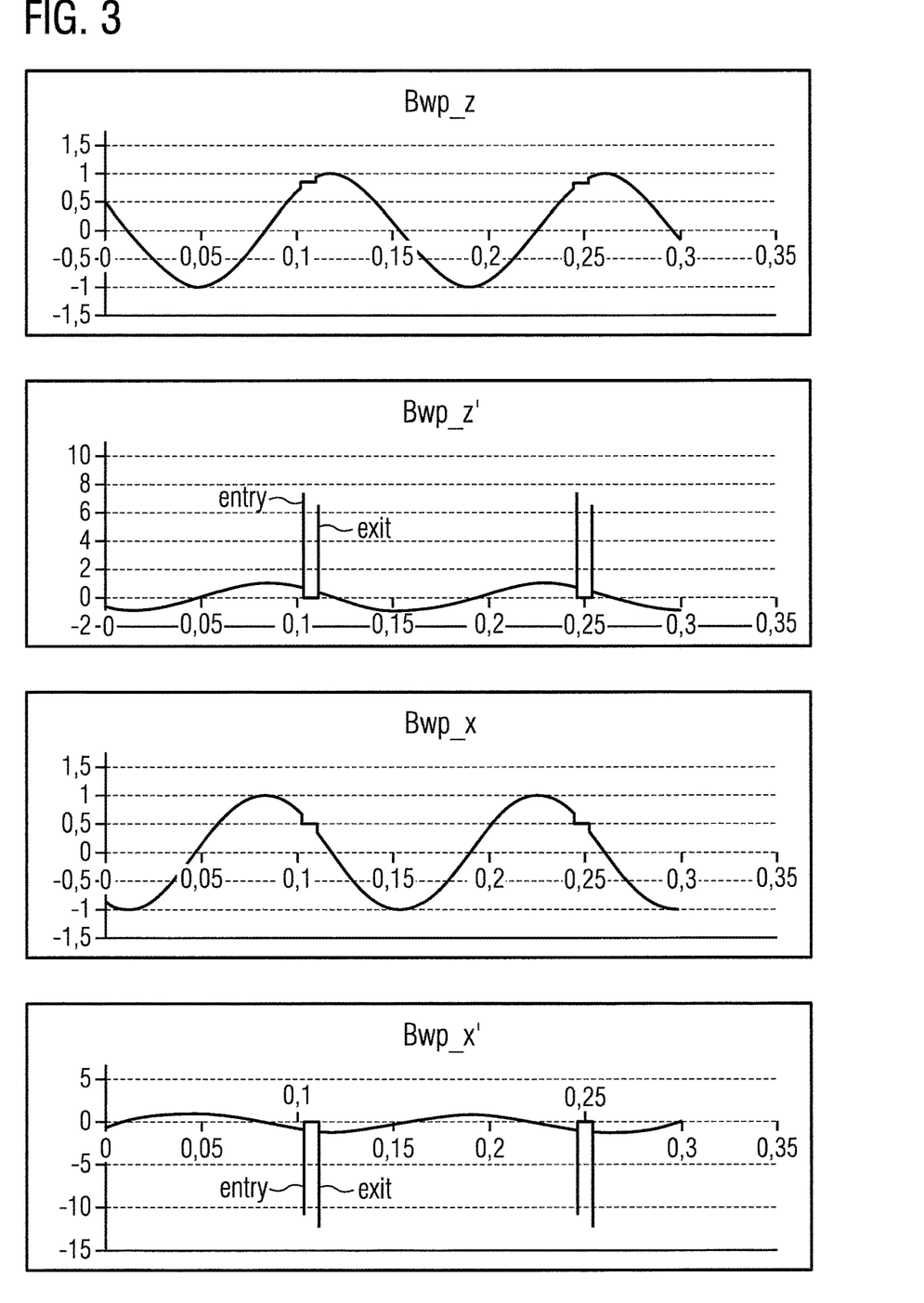
FIG. 3 depicts signal processing in an embodiment.

In the following the signal processing in an embodiment will be described in more detail. As further shown in FIG. 1, there may be an optional Analog-Digital-Converter (ADC) 16 converting an analog signal from the magnetic earth field sensor 20 to a digital signal for further processing by the processing module 14, using an appropriate sampling rate. In an embodiment the device 10 may hence comprise an analog-digital converter 16 configured to sample an analog signal of the magnetic earth field sensor 20 into a digital signal. The digital signal may then be numerically differentiated. FIG. 3 depicts the signal processing in an embodiment. FIG. 3 shows four viewgraphs with the signal sequences of $B_{wp\_z}$ at the top, the differentiated signal $B_{wp\_z}'$ of $B_{wp\_z}$ below, $B_{wp\_x}$, as second from the bottom and the differentiated version $B_{wp\_x}'$ of $B_{wp\_x}$ at the bottom. The ordinates show normalized amplitudes and the abscissa show time.

The differentiated signal versions $B_{wp\_z}'$ and $B_{wp\_x}'$ illustrate that the differentiated sensor signals show significant peaks or deviations at the entry and exit of the footprint 32. In embodiments a comparison of the differentiated signal with a threshold may be used to determine a time or duration between the entry and the exit of the footprint 32. The processing module 14 may hence be configured to determine the information indicating the length of the footprint 32 based on a differentiation of the signal from the magnetic earth field sensor 20. The processing module 14 may be further configured to differentiate the signal and to compare a differentiated version of the signal to a threshold. The processing module 14 may be configured to determine first time information on when the magnetic earth field sensor 20 enters a footprint 32 section of the tire 30, cf. FIG. 3, and second time information on when the magnetic earth field sensor 20 exits the footprint 32 section through the threshold comparison, information on a duration between entry and exit, respectively.

In some embodiments the threshold can adapted dynamically, e.g. based on the signal sequence. For example, the processing module 14 is configured to dynamically adapt the threshold. The processing module 14 may be configured to adapt the threshold relative to a maximum signal amplitude. The processing module 14 may be configured to determine the information indicating the length of the footprint 32 based on a relation of information on a footprint 32 duration and information on a duration of a rotation cycle of the tire 30. The signals or differentiated signals may hence be used in embodiments to also determine a rotational period or cycle of a wheel.

A relation between the duration of the footprint 32 section and the duration of a rotation cycle of the wheel may then serve as indicator for the footprint length. For the simulations to obtain the signals depicted in FIG. 3, it was assumed that the magnetic earth field is constant around the vehicle 100. The signal sequence depends on the inclination of the magnetic field (angle between the magnetic field vector and the horizontal axis, cf. FIG. 2). Simulations show that for an inclination of 90° the z-vector may not be advantageous, as deviations upon entry and exit of the footprint 32 are rather small. The x-vector of component may be disadvantageous for an inclination of 0° for the same reason. In central Europe the inclination is about 60° and both components, x and z, produce signals, which are sufficient around the footprint section. In some embodiments the magnetic earth field sensor 20 may provide signals for both components, multiple sensors 20 may be used, respectively, to further improve the reliability or fail-safe robustness.

In practical implementations of embodiments the pulses as depicted in FIG. 3 may not be as narrow as in the simulation. The entry and exit points of the footprint 32 may not be as abrupt or sudden as in the simulation. Moreover, the signal amplitude may depend on the length of the footprint 32, the longer the footprint the higher is the signal amplitude. The shorter the length of the footprint the lower is the signal amplitude. In some embodiments the threshold is therefore adaptive to the signal amplitude, e.g. on the basis of a calculated or estimated maximum signal amplitude of the (non-differentiated) signal, which is, for example, multiplied with a certain factor. Moreover, the effective magnetic field component, the component in the rotation plane of the wheel, may depend on the driving direction. In a disadvantageous scenario with low inclination the magnetic field vector may be orthogonal to the rotation plane and a measurement or footprint determination may be temporarily discontinued and there may be a delay for determining the length of the footprint 32. As has been mentioned above, the processing module 14 may be configured to determine load information of the tire 30 or the vehicle 100 based on the information indicating the length of the footprint 32. For example, depending on a tire pressure, the higher the length of the footprint 32, the higher is the load of the tire 30 or vehicle 100, vice versa, respectively.

In further embodiments the processing module 14 is configured to carry out a localization of multiple tires 30 on wheels of a vehicle 100. For example, the footprint, it's entry or exit point, respectively, of a tire 30 also determines a certain angular reference, which can be correlated with other angular state information of the wheel or tire. For example, the processing module 14 may be configured to correlate rotational frequencies of the wheels determined based on the signal with reference information on the rotational frequencies of the wheels. During curves the rotational frequencies of the wheels are different and the correlation may enable identification/localization of tire pressure modules (implemented together with the magnetic earth field sensor 20) in the tires 30 via a mapping of the rotational frequencies of the modules and the wheels, reference values, respectively. The reference information on the rotational frequencies of the wheels may be information provided by an Anti-lock Braking System (ABS). In further embodiments the processing module 14 may also be configured to carry out a localization of multiple tires 30 on wheels of the vehicle 100. The processing module 14 may then be configured to correlate an angular position of a wheel indicated by the signal with reference information on angular positions of the wheel. The reference information on the angular position may be information provided by ABS. Entry and/or exit angles of the wheels of a vehicle are different. For example, according to the above description a current or instantaneous angle determined using the TPMS may be correlated with wheel angles determined by ABS, and TPMS modules may be identified and located.

A further embodiment is a TPMS comprising the device 10, the magnetic earth field sensor 20 and potentially further components. In an embodiment the device 10 comprises the magnetic earth field sensor 20 and the tire 30. As further indicated in the Figs, another embodiment is a tire 30 pressure measurement system comprising the device 10. Yet another embodiment is a tire 30 for a vehicle 100 comprising a magnetic earth field sensor 20 configured to generate a signal indicating a measured magnetic earth field. Another embodiment is a vehicle 100 comprising the device 10 and/or the tire 30.

Figure 4:
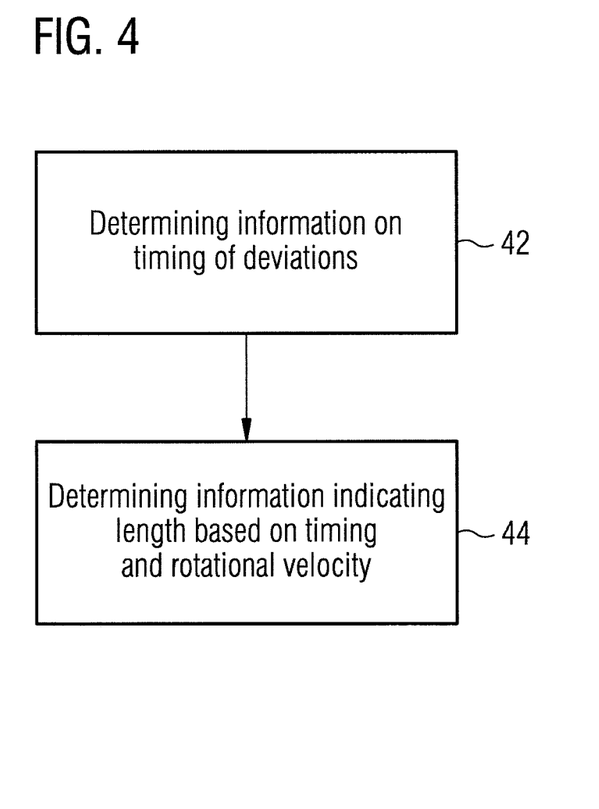
FIG. 4 shows a block diagram of a flow chart of an embodiment of a method for determining information indicating a length of a footprint.

FIG. 4 shows a block diagram of a flow chart of an embodiment of a method for determining information indicating a length of a footprint 32. The method for determining information indicating a length of a footprint 32 of a tire 30 from a signal indicating a measured magnetic earth field comprises determining 42 information on a timing of deviations from a sinusoidal signal sequence in the signal. The method further comprises determining 44 the information indicating the length of the footprint 32 based on the timing of the deviations and information indicating a rotational velocity of the tire 30. In a further embodiment the method further comprises generating the signal indicating the measured magnetic earth field, for example, using an in-tire magnetic earth field sensor 20.

Another embodiment is a computer program product comprising a computer readable medium having computer readable program code embodied therein, the computer readable program code being configured to implement one or more of the above described methods, when/if being loaded on a computer, a processor, or a programmable hardware component. Another embodiment is a computer program having a program code on a non-transitory media for performing, when/if the computer program is executed on a computer or on a processor, one of the above methods. A further embodiment is a computer readable storage medium storing instructions which, when/if executed by a computer, cause the computer to implement one of the methods described herein.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "means", may be provided through the use of dedicated hardware, such as "a processor", "a sensor", "a controller", "a transmitter", "a receiver" etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple sub-steps. Such sub-steps may be included and part of the disclosure of this single step unless explicitly excluded.

What is claimed is:

1. A device for determining information indicating a length of a footprint of a tire, the device comprising:
   an input interface communicatively coupled to a magnetic earth field sensor and configured to receive a signal from the magnetic earth field sensor that is configured to generate the signal indicating a measured magnetic earth field; and
   at least one processor coupled to the input interface and configured to receive the signal therefrom and determine the information indicating the length of the footprint of the tire based on the signal indicating the measured magnetic earth field,
   wherein the at least one processor is configured to determine load information of the tire or a vehicle based on the information indicating the length of the footprint,
   wherein the at least one processor is configured to determine a timing of deviations from a sinusoidal signal sequence in the signal, and
   wherein the at least one processor is configured to determine the information indicating the length of the footprint based on the timing of the deviations and information indicating a rotational velocity of the tire.

2. The device of claim 1, wherein the magnetic earth field sensor is configured to measure the magnetic earth field along at least one of a radial direction of the tire or a tangential direction of the tire.

3. The device of claim 1, further comprising:
   an analog-digital converter configured to sample an analog signal of the magnetic earth field sensor into a digital signal.

4. The device of claim 1, further comprising:
   the magnetic earth field sensor and the tire.

5. A device for determining information indicating a length of a footprint of a tire, the device comprising:
   an input interface communicatively coupled to a magnetic earth field sensor and configured to receive a signal from the magnetic earth field sensor that is configured to generate the signal indicating a measured magnetic earth field; and
   at least one processor coupled to the input interface and configured to receive the signal therefrom and determine the information indicating the length of the footprint of the tire based on the signal indicating the measured magnetic earth field,
   wherein the at least one processor is configured to determine load information of the tire or a vehicle based on the information indicating the length of the footprint,
   wherein the at least one processor is configured to determine the information indicating the length of the footprint based on a differentiation of the signal, and
   wherein the at least one processor is configured to differentiate the signal and to compare a differentiated version of the signal to a threshold.

6. The device of claim 5, wherein the at least one processor is configured to determine first time information on when the magnetic earth field sensor enters a footprint section of the tire, and second time information on when the magnetic earth field sensor exits the footprint section of the tire through the threshold comparison, and wherein the at least one processor is configured to determine the information indicating the length of the footprint based on a relation of information on a footprint duration and information on a duration of a rotation cycle of the tire.

7. The device of claim 6, wherein the at least one processor is configured to dynamically adapt the threshold relative to a maximum signal amplitude.

8. A device for determining information indicating a length of a footprint of a tire, the device comprising:
an input interface communicatively coupled to a magnetic earth field sensor and configured to receive a signal from the magnetic earth field sensor that is configured to generate the signal indicating a measured magnetic earth field; and
at least one processor coupled to the input interface and configured to receive the signal therefrom and determine the information indicating the length of the footprint of the tire based on the signal indicating the measured magnetic earth field,
wherein the at least one processor is configured to determine load information of the tire or a vehicle based on the information indicating the length of the footprint,
wherein the at least one processor is configured to carry out a localization of multiple tires on wheels of a vehicle, wherein the at least one processor is configured to correlate rotational frequencies of the wheels determined based on the signal with reference information on the rotational frequencies of the wheels, or wherein the at least one processor is configured to correlate an angular position of a wheel indicated by the signal with reference information on angular position of the wheel.

9. The device of claim 8, wherein the at least one processor is configured to determine a timing of deviations from a sinusoidal signal sequence in the signal, and wherein the at least one processor is configured to determine the information indicating the length of the footprint based on the timing of the deviations and information indicating a rotational velocity of the tire.

10. The device of claim 8, wherein the reference information is information provided by an anti-lock braking system.

11. A tire pressure measurement system comprising:
an input interface communicatively coupled to a magnetic earth field sensor and configured to receive a signal from the magnetic earth field sensor that is configured to generate the signal indicating a measured magnetic earth field; and
at least one processor coupled to the input interface and configured to receive the signal therefrom and configured to determine the information indicating the length of the footprint of the tire based on the signal indicating the measured magnetic earth field,
wherein the at least one processor is configured to determine load information of the tire or a vehicle based on the information indicating the length of the footprint,
wherein the at least one processor is configured to determine a timing of deviations from a sinusoidal signal sequence in the signal, and
wherein the at least one processor is configured to determine the information indicating the length of the footprint based on the timing of the deviations and information indicating a rotational velocity of the tire.

12. A tire for a vehicle comprising:
a magnetic earth field sensor configured to generate a signal indicating a measured magnetic earth field; and
a device comprising:
an input interface communicatively coupled to the magnetic earth field sensor and configured to receive the signal from the magnetic earth field sensor; and
at least one processor coupled to the input interface and configured to receive the signal therefrom and configured to determine information indicating a length of a footprint of the tire based on the signal indicating the measured magnetic earth field,
wherein the at least one processor is configured to determine load information of the tire or a vehicle based on the information indicating the length of the footprint,
wherein the at least one processor is configured to determine a timing of deviations from a sinusoidal signal sequence in the signal, and
wherein the at least one processor is configured to determine the information indicating the length of the footprint based on the timing of the deviations and information indicating a rotational velocity of the tire.

13. A method for determining information indicating a length of a footprint of a tire from a signal indicating a measured magnetic earth field, the method comprising:
determining, by at least one processor, information on a timing of deviations from a sinusoidal signal sequence in the signal;
determining, by the at least one processor, the information indicating the length of the footprint based on the timing of the deviations and based on information indicating a rotational velocity of the tire; and
determining, by the at least one processor, load information of the tire or a vehicle based on the information indicating the length of the footprint.

14. The method of claim 13, further comprising:
generating the signal indicating the measured magnetic earth field.

15. A non-transitory computer-readable medium encoded with computer readable program code configured to implement a method for determining information indicating a length of a footprint of a tire from a signal that indicates a measured magnetic earth field, the method comprising:
determining, by at least one processor, information on a timing of deviations from a sinusoidal signal sequence in the signal;
determining, by the at least one processor, the information indicating the length of the footprint based on the timing of the deviations and information indicating a rotational velocity of the tire; and
determining, by the at least one processor, load information of the tire or a vehicle based on the information indicating the length of the footprint.

* * * * *